Dec. 24, 1935.    H. Q. MUNN    2,025,215
LEAD TESTING DEVICE
Filed Oct. 12, 1931    4 Sheets-Sheet 1

INVENTOR
Henry Q. Munn.
BY
Harness, Dickey, Pierce & Hanna.
ATTORNEYS.

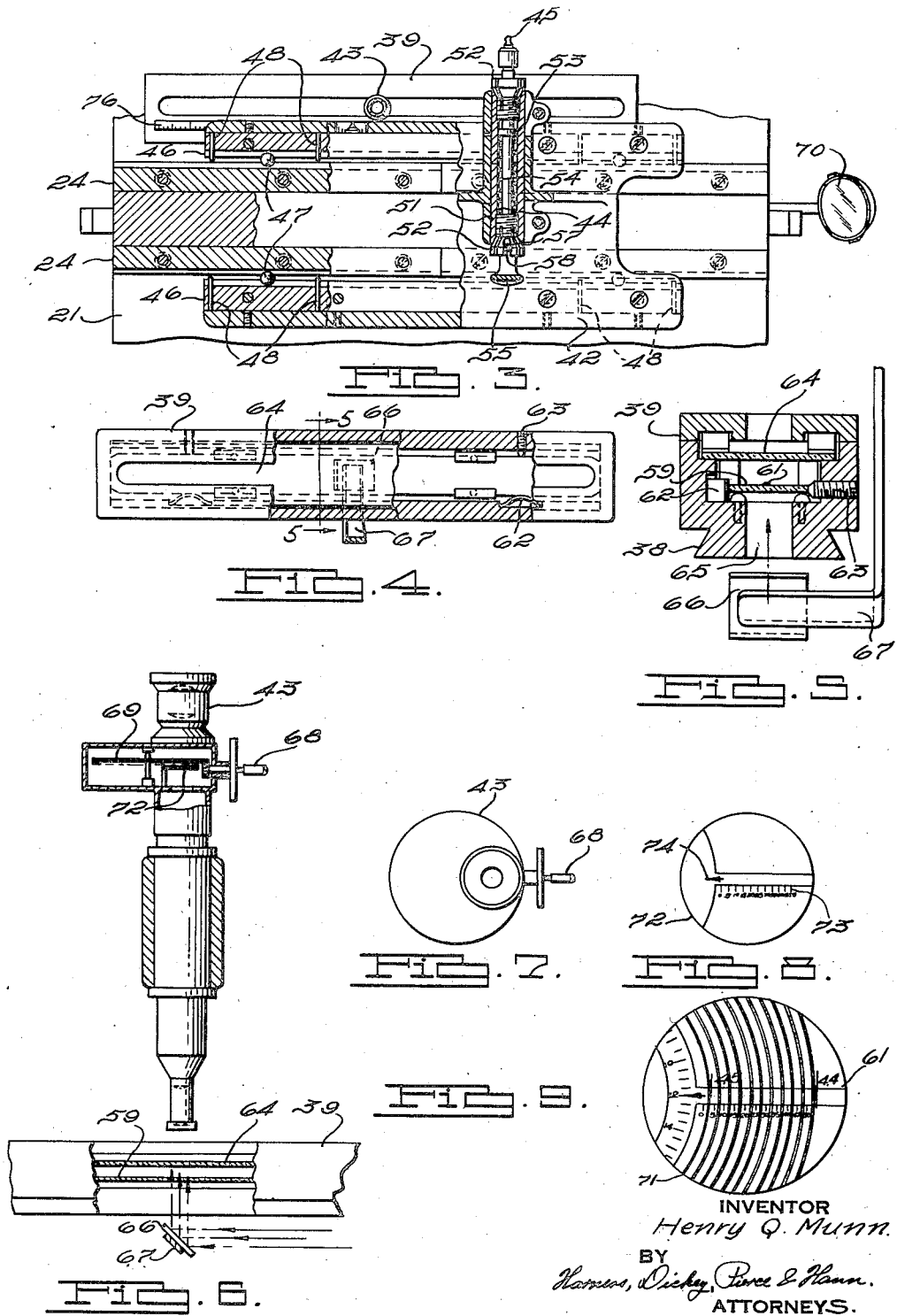

Dec. 24, 1935.  H. Q. MUNN  2,025,215

LEAD TESTING DEVICE

Filed Oct. 12, 1931  4 Sheets-Sheet 3

INVENTOR
Henry Q. Munn.
BY
ATTORNEYS.

Dec. 24, 1935.  H. Q. MUNN  2,025,215
LEAD TESTING DEVICE
Filed Oct. 12, 1931  4 Sheets-Sheet 4

INVENTOR
Henry Q. Munn.
BY
Harness, Dickey, Pierce & Hann
ATTORNEYS.

Patented Dec. 24, 1935

2,025,215

UNITED STATES PATENT OFFICE 2,025,215

LEAD TESTING DEVICE

Henry Q. Munn, Detroit, Mich., assignor to Detroit Tap & Tool Co., a corporation of Michigan Application October 12, 1931, Serial No. 568,216

5 Claims. (Cl. 33—199)

My invention relates to lead testing devices and particularly to a device which is compact in form, simple in operation, and precise in measuring the lead of threads on taps, dies, chasers and other articles.

The main objects of my invention are; to provide a lead testing device in which the article, having the threads to be tested, is readily positioned adjacent to a reading instrument; to provide a reading instrument which is extremely accurate and capable of measuring absolute rectilinear distances, such as pitch or lead, within a degree of accuracy of 1/20,000 of an inch; of mounting the instrument on a movable carriage, the position of which is regulated by a ball pointed plunger which accurately engages the threads; to provide an attachment for the device which supports articles having threads on flat surfaces in the nature of chasers or the like; and to provide a clamping means for a circular element having threads for testing the thread at different points on the periphery separated by known arcs so as to check the thread for a drunken lead.

Figure 1:
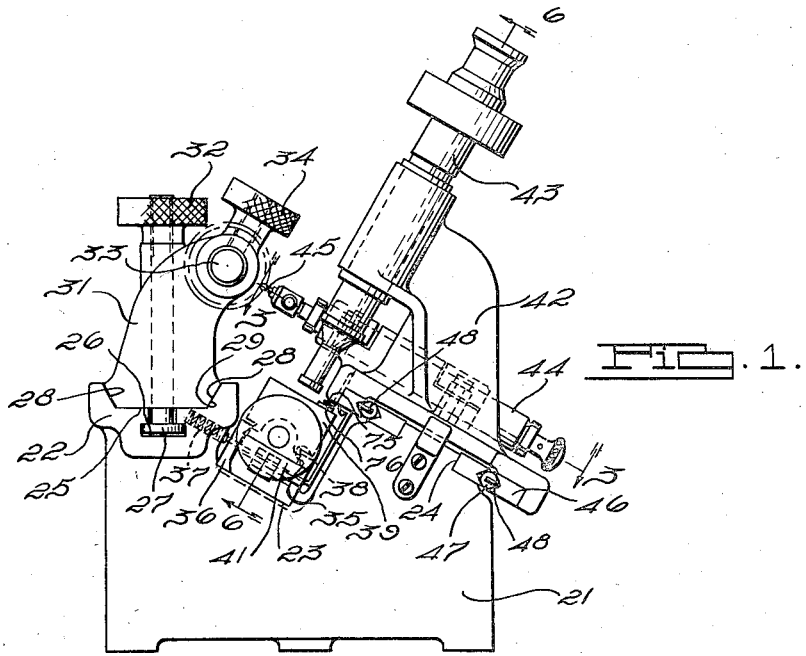
Figure 2:
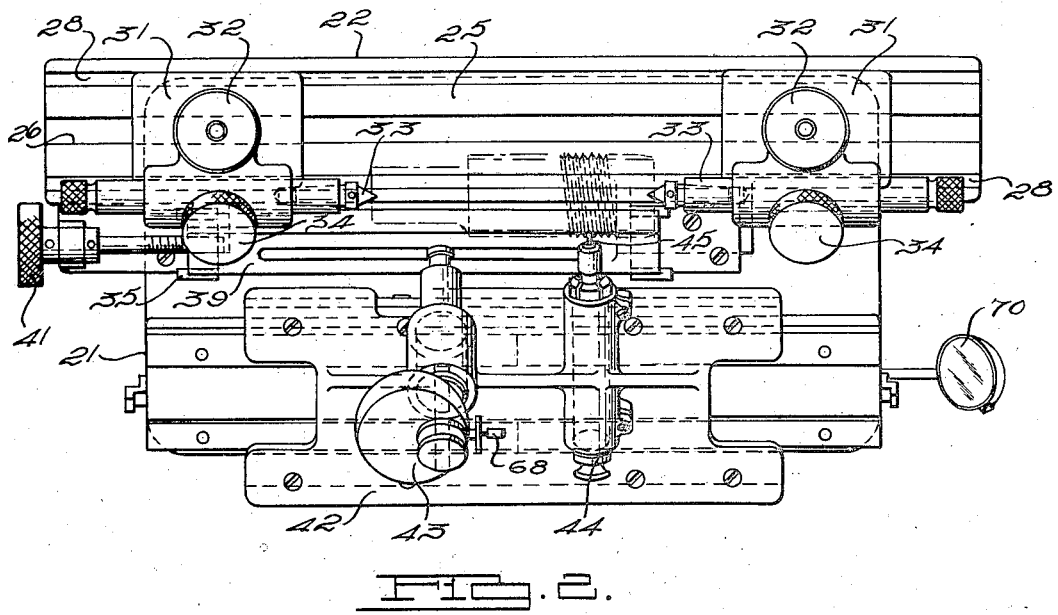

Other objects and features of novelty of my invention will be either specifically pointed out or will become apparent when referring, for a better understanding of my invention, to the following description in conjunction with the accompaying drawings, wherein:

Figure 1 is an end view, in elevation, of a lead testing device embodying features of my invention, Fig. 2 is a plan view of the structure illustrated in Fig. 1, Fig. 3 is a sectional view of the structure illustrated in Fig. 1, taken on the line 3—3 thereof, with other parts in section and in elevation.

Figure 10:
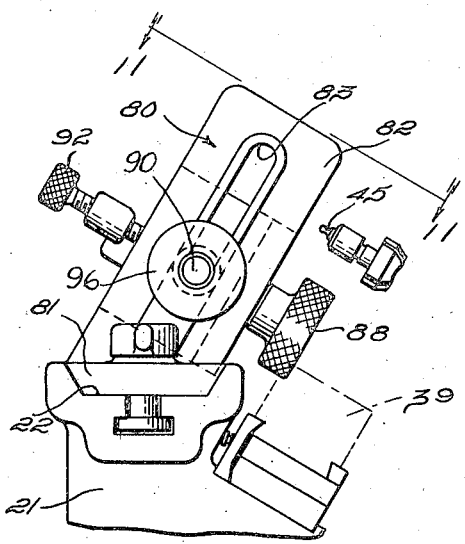
Figure 12:
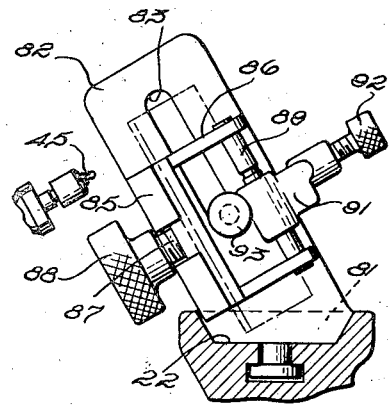
Figure 11:
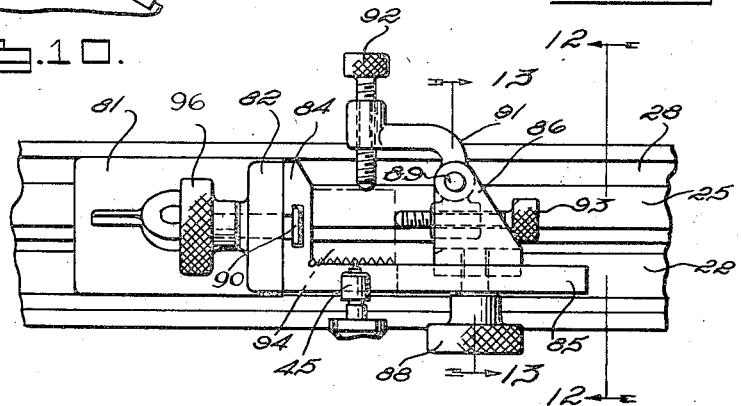
Figure 13:
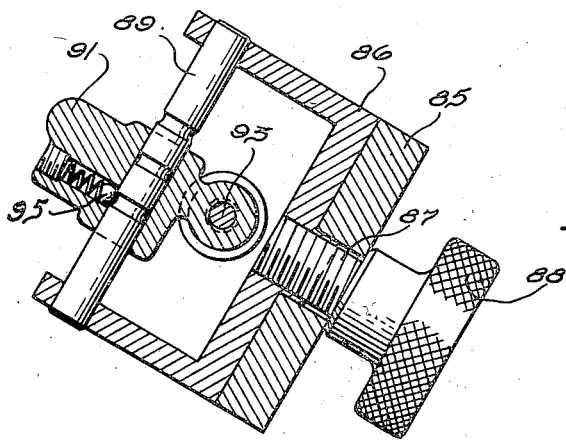
Figure 14:
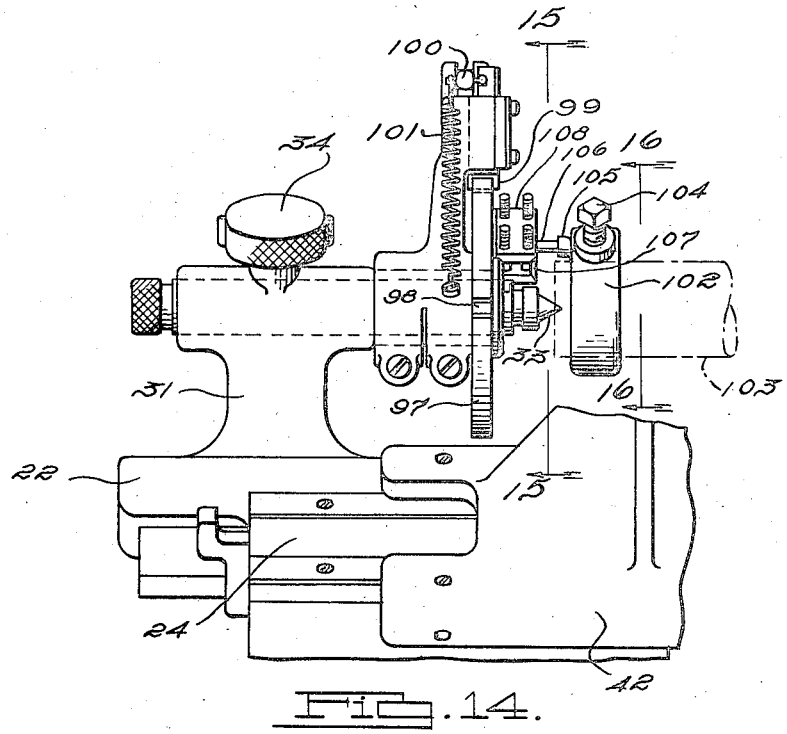
Figures 15, 16:
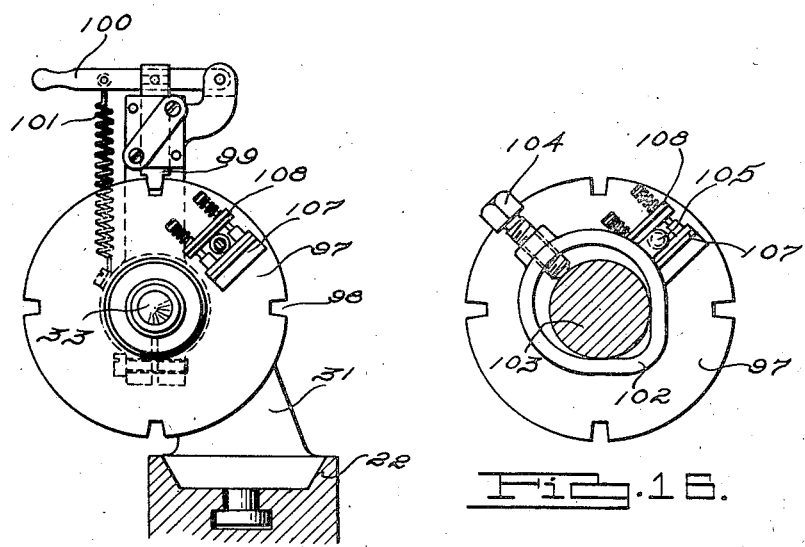

Fig. 4 is a broken plan view of an illuminable scale which forms a part of my invention, Fig. 5 is an enlarged sectional view of the structure illustrated in Fig. 4, taken on the line 5—5 thereof, Fig. 6 is a sectional view of the structure illustrated in Fig. 1, taken on the line 6—6 thereof, Fig. 7 is a top plan view of the reading instrument illustrated in Figs. 1 and 6, Fig. 8 is an enlarged view of a stationary scale provided in the instrument illustrated in Fig. 6, Fig. 9 is an enlarged view of the rotatable scale and spiral of the instrument illustrated in Fig. 6, superimposed over the fixed scale illustrated in Fig. 8 and shows also the graduations of the measuring scale as seen through microscope, Fig. 10 is an end view, in elevation, of a work holding attachment for the device, Fig. 11 is a plan view of the structure illustrated in Fig. 10, taken in the plane 11—11 thereof, Fig. 12 is a sectional view of the structure illustrated in Fig. 11, taken on the line 12—12 thereof, Fig. 13 is an enlarged sectional view of the structure illustrated in Fig. 11, taken on the line 13—13 thereof, Fig. 14 is a broken view, in elevation, of an indexing device which may be employed with the structure illustrated in Figs. 1 and 2, Fig. 15 is a sectional view of the structure illustrated in Fig. 14, taken on the line 15—15 thereof, and Fig. 16 is a sectional view of the structure illustrated in Fig. 14, taken on the line 16—16 thereof.

The lead testing machines now used in the art employ either purely mechanical methods or purely optical methods, both of which have certain disadvantages which I have overcome in the lead testing device of my present invention; which embodies a combination of optical and mechanical methods of measuring. In the optical type of device a large number of readings are necessary in order to effect the set-up of the thread relative to the optical instrument and considerable time is required for taking each of the readings. The mechanical method utilizes micrometer screws or gauge blocks, the former of which develops inaccuracy because of local wearing of the thread thereof, while the latter introduces errors because of the wearing of the surfaces or the presence of dust particles or the like on its faces. Also errors are introduced due to local changes of temperature caused by handling the measuring elements, such as micrometer screw or gauge blocks.

In practising my invention I employ a standard upon which means are provided for supporting the element having threads to be tested and mount a carriage on the standard in such manner as to be accurately positioned and free to move longitudinally thereon. A microscope, having a micrometer scale, is mounted on the carriage for movement therewith and positioned in such manner as to be focused on a measuring scale supported in fixed but adjustable relation on the standard. The carriage is also provided with a ball point, carried by a plunger, which is adjusted so as to have no lateral play relative to the carriage upon which it is mounted.

When the plunger is biased forward by a spring into a position of engagement with the thread of an element, it mechanically locates the carriage with reference to the thread and the position of the carriage is read in the microscope in conjunction with the spiral micrometer. The plunger is then withdrawn and moved a predetermined distance, for example, approximately an inch, and released to be biased adjacent to the thread, to again position the carriage relative to the thread and micrometer reading again taken. When the carriage is moved in this manner to have the plunger engage threads substantially an inch apart, if the thread is exactly true there will be no change in the micrometer reading. Any error in the lead of the thread will cause an adjustment to be made in the optical system to bring the scales into coincidence, the amount of which is the error appearing in one inch of thread, provided the carriage was moved substantially one inch.

Referring to the drawings, a bed 21 is provided with longitudinally extending element receiving tracks or raceways 22, 23 and 24. The track 22 is provided with a bottom web 25, having a slot 26 therein for receiving the head of a bolt 27, and outwardly sloping sides 28 for receiving the sloping side 29 of a work supporting element 31. The bolt 27 extends through the element 31 which is slidable on the track 22 a predetermined distance to be spaced from a second element 31 and clamped to the base 21 by means of a nut 32. The two work supporting elements 31 are provided with centers 33 which, after being positioned to support the work, are clamped in fixed position by a thumb screw 34.

The track 23 is provided with a fixed side 35 sloping to form one side of a dovetailed slot, while the other side 36 is separated therefrom and biased by a spring 37 toward the side 35. The flexible dovetailed slot thus formed engages the dovetail 38 of the scale supporting housing 39 which is movable longitudinally in the track 23 by a thumb screw 41, illustrated in Figs. 1 and 2, the purpose of which will be explained hereinafter.

The third track or raceway 24, supports a movable carriage 42 upon which the optical micrometer 43 is mounted to be at right angles to the scale carrying housing 39, as illustrated in Fig. 1. At right angles to the micrometer, a spring biased plunger 44 is mounted on the carriage having a ball point 45 on its end for engaging the thread in a manner which will be explained hereinafter. The carriage is provided with raceways 46 complementary to the raceways 24 between which ball bearings 47 are provided for accurately positioning the table relative to the bed 21 and at the same time for permitting the longitudinal movement of the carriage relative thereto.

In Fig. 3 I have illustrated the raceways 24 and 46 as having a ball 47 at each of their ends, employing in all, four balls for positioning the table. Pins 48 are positioned in the raceways 46 extending in the path of the balls 47 to limit their degree of movement. I have shown the pins 48 spaced apart substantially two inches which will permit the table to travel four inches as the ball rolls from one pin to the other. The employment of the pins at the ends of the raceways 46 retains the balls near the end corners of the carriage so as to accurately position the carriage relative to the table and at the same time permit a large movement of the table laterally along the raceways. After readings have been taken within the length in which the balls may roll, the carriage may be forced along the tracks while the balls are not rolling and are in engagement with the pins, past the position in which a measurement is to be made, after which the carriage may be rolled backwardly therefrom to operate within a new area between which the balls will roll when moving from one pin to the other.

The plunger 44 is mounted in a sleeve 51, each end of which is threaded internally and provided with collet-like collars 52 through which the body portion of the plunger extends. A collar 53 is attached to the body portion of the plunger which engages one end of a spring 54 for biasing the plunger outwardly from the carriage toward the work. The collet-like collars 52 are adjusted to take up any play or slack between the plunger and the sleeve 51 and at the same time permitting the longitudinal movement of the plunger. A handle 55 is mounted on the rear end of the plunger for effecting its manipulation while a ball point 45, as pointed out above, is mounted on the opposite end for engaging the thread of the work piece. The elimination of play between the plunger and the carriage is necessary so as to have the carriage positioned by the plunger relative to the thread. That is to say, when the plunger is biased forwardly by the spring 54, it will seat itself firmly in a thread of the element to be tested and in doing so will adjust itself laterally through the movement of the carriage. In this manner the carriage is positioned relative to the thread and scale through the engagement of the ball point 45 with the thread. The plunger 44 is prevented from turning in the collets 52 by a pin 57 on the handle 55 which operates in a slot 58 provided in the rear collet, as illustrated in Fig. 3. When prevented from rotating, the irregularities in the plunger or ball point will be prevented from affecting the readings.

As pointed out above, the carriage 42 supports the optical micrometer 43 which is directed and focused on the scale retained in the housing 39 for the purpose of taking a reading of the position of the carriage. Referring to Figs. 4 and 5, I illustrate the scale retaining member 39 as being provided with a transparent element 59 upon which an extremely accurate scale 61 is provided. Spring clips 62 are provided in the hollow interior of the block 39 to bias the scale against the end of adjusting screw 63 by which the scale is positioned in the block relative to the micrometer instrument. A transparent cover 64 is mounted over the top of the scale to prevent dirt or dust from accumulating thereon.

An opening 65 is provided below the scale through which light may be reflected by a mirror 66 which is carried on an arm 67 which is attached to the carriage in the path of the line of vision through the microscope 43, as illustrated more clearly in Fig. 6. A mirror 70 is positioned at the end of the bed to reflect light from a window or other source, longitudinally of the scale retaining block 39 onto the mirror 66, for illuminating the scale 61.

Referring to Figs. 6, 7, 8 and 9, I have illustrated the preferred construction of the micrometer optical instrument 43 which is well known in the art and which forms no separate part of my present invention. An adjusting handle 68 extends from the side of the instrument for the purpose of operating the disc 69 which is of transparent material and provided with a double line spiral 71, as illustrated in Fig. 9. A fixed disc 72 is supported in the line of vision through the instrument, as illustrated in Fig. 6, to have the scale 73 thereof and the pointer mark 74 superposed relative to the scale on the disc 69. In this construction three scales are superposed upon each other, first the scale 61 on the transparent plate 59, the scale 73 on the disc 72 and the scale and the double line spiral 71 on the disc 69.

When the tool is initially set up for a reading the knob 68 is turned to its zero setting relative to the scale 73 and the scale containing element 39 is adjusted laterally, through the operation of the thumb screw 41, to have a line thereof coincide with the zero line of the scale 73, which will also coincide with the spiral lines 71. When the instrument is set up in this manner the ball point 45 is withdrawn from contact with the thread of the element to be tested and the carriage is shifted laterally to the right or left a predetermined even distance such, for example, as one inch which is roughly indicated by a pointer 75 and a scale 76, as illustrated in Fig. 1.

The handle 55 is then released to permit the ball point 45 to adjust itself relative to the thread which, in the present instance, should be exactly one inch from the setting originally made. The carriage adjusts itself relative to the position of the plunger 44 and the thread, in the manner pointed out hereinabove, and a reading is taken. If the helical lead of the thread is exactly correct the line on the scale 61 disposed one inch from the line from which the original setup was made, will exactly coincide with the zero point of the scale 73 and with the helical lines 71.

In case the helical lines are spaced from the line in question on the scale 61, the knob 68 is turned until the scale line is positioned between the double helix lines 71, at which time a reading is taken and the error in the lead of the thread in one inch is in this manner obtained. For example, referring to Fig. 9, after the double helix line 71 has been moved between the zero and 5 position relative to the scale 73 to be intersected by the line on the scale 61, the reading will be 4.51202, the last two figures being read from the scale 73. Thus if the initial setting relative to the selected line on the scale 61 was 3.5, the error in the lead in one inch of thread will be .0120 of an inch.

While the structure so far described is utilized for checking the lead of threads of cylindrical members, I have illustrated in Figs. 10 to 13 inclusive, a structure which may be attached to the apparatus so that it may be employed for checking the lead in threads of rolling dies, chasers and similar work pieces. An adapter 80 is provided with a base portion 81 similar to the base portion of the center supporting members 31 which may cooperate with the track 25 for supporting the adapter on the bed 21. An arm 82 extends upwardly at right angles to the base 81 and at an angle to the vertical to have the edge thereof disposed at right angle to the plunger 44, as illustrated in Fig. 10.

A slot 83 is provided in the arm 82 for receiving the work supporting member 84 which is clamped thereto by a bolt 90 and a thumb nut 96, and which is adjustable in the slot 83 relative to the ball point 45. The work supporting member 84 is provided with a laterally extending arm 85 which is slotted, as illustrated in Fig. 13, for the purpose of adjustably supporting a bracket 86 through the medium of a stud 87 and a thumb nut 88. The bracket 86 is provided with a serrated pin 89 which supports a clamping element 91. The clamping element is rockable about the pin 89 and is provided with a pair of set screws 92 and 93 which may be adjusted to engage the top and sides of the threaded element 94 which is to be tested.

When a short work piece 94 is to be tested, the bracket 91 may be slid along the pin 89 to the outermost position, as illustrated in Fig. 13, where it is locked by means of a biased ball 5. After a work piece is clamped in the device, the unloosening of the screw 93 releases the work piece from the work holder 84 which permits the insertion of a new work piece 94 therein which may be clamped on both sides by manipulating a single screw 93.

It is to be understood that the thumb nut 88 may be unloosened and the bracket 86 moved laterally to be spaced from the end 84 a distance relative to the width of the work pieces 94. In this construction the element to be tested is disposed with its threaded surface at a right angle to the movement of the plunger 44 to permit the threads on the work piece 94 to be checked for leads in the same manner as specified hereinabove when the threads on cylindrical elements were checked.

A further utility of my device is effected through the indexing attachment which may be employed therewith, as illustrated in Figs. 14, 15 and 16. It is well known to those skilled in the art that the measurement along one side of an element does not produce a positive and reliable check of the accuracy of the lead because of the fact that, while the lead may be accurate in a certain plane, in a plane opposite thereto or on the opposite side of the tool in the same plane, may be staggered from a true helical thread. Such a thread is known in the art as being possessed of a "drunken lead" and the structure illustrated in Figs. 14, 15 and 16 provides a method whereby the stagger in the thread may be checked.

An index head 97 is attached in fixed relation to the centering element 33, having indexing notches 98 at the periphery thereof which are engaged by a detent 99 operated in opposite directions by a handle 100 and a spring 101 to position the head 97 which is rotatable relative to the centering element 33. A dog 102 is attached to the shank of the element 103 to be tested, through the medium of a set screw 104, as illustrated in Fig. 16. The dog is provided with an arm 105 having a pin 106 extending therefrom which is engaged between a block 107 and a bias element 108 on the head 97, which firmly clamp the dog relative to the head. When the element 103 is clamped in this manner and the reading is taken along one plane of the thread, the work piece may then be revolved a quarter, a half or three-quarters of a turn, as the case may be, or otherwise, depending upon the number of notches 98 provided in the index head 97.

The readings are then taken in a plane angularly related to the plane in which the readings were originally taken and the theoretical reading relative to the angle between readings, is computed and checked with the actual reading obtained. In this manner, the thread may accurately be checked for a drunken lead with very little additional effort or time, over that required for checking the lead along one plane of the thread.

It will thus be seen that I have provided an extremely simple instrument which may be employed in the work shop for checking the lead of threads on tools for accuracy as well as for drunken lead. The operation of the instrument is extremely simple, requiring no special degree of skill in the operator to effect accurate readings of threads on flat or curved elements which are readily attachable to the supporting structure.

While I have described and illustrated several embodiments of my invention, it will be apparent to those skilled in the art that various changes, additions, omissions and substitutions may be made therein without departing from the spirit and scope of my invention, as set forth in the accompanying claims.

I claim as my invention:

1. A device for measuring the accuracy of the pitch and lead of a threaded element including, in combination, a base, means for securing and adjustably supporting the elements on the base, a carriage movable on said base, a thread engaging member controlling the position of said carriage, biasing means for moving the thread engaging member into engagement with the threaded element in position normal thereto, a transparent scale on said base, means for moving said scale relative to the base, means for illuminating the under side of said scale, and an optical micrometer and microscope carried by said carriage for reading the position thereof on the scale.

2. A device for measuring the accuracy and pitch and lead of a thread including, in combination, a base, a carriage movable on said base, a thread engaging member mounted on said carriage and movable laterally to the direction of movement thereof, means for retaining said member against rotation, means for supporting the threaded element which is adjustable to position the threaded surface normal to the movement of the thread engaging member, a transparent scale on said base, means on said base for moving said scale relative thereto, means for illuminating the under side of said scale, and an optical micrometer and microscope carried by said carriage for reading its position on the scale.

3. A device for measuring the accuracy of the pitch and lead of a threaded element having a flat surface upon which threads are disposed, including, in combination, a base, a carriage movable on said base, a thread-engaging member controlling the position of the carriage, a support, a bracket adjustable on said support, an adjustable member on said bracket, a pivotal bell crank mounted on said adjustable member having adjusting screws on each arm thereof for clamping said element to have the threads disposed normal to said thread-engaging member, and an optical micrometer and microscope carried by said carriage for reading the position thereof.

4. A device for measuring the accuracy of the pitch and lead of a threaded element including, in combination, a base, standards on said base at least one of which is adjustable, centers carried by said standards for engaging and supporting an element to be tested, a carriage movable parallel to the axis of said centers, a spring pressed plunger mounted on said carriage and disposed normal to its path of movement, a micrometer microscope mounted on said carriage normal to its path of movement and to that of the plunger, a transparent scale disposed below said microscope and parallel to the path of movement of the carriage, and means for shifting said scale longitudinally of its length.

5. A device for measuring the accuracy of the pitch and lead of a threaded element including, in combination, a base, standards on said base at least one of which is adjustable, means carried by said standards for engaging and supporting an element to be tested, a carriage movable parallel to the axis of said supporting means, a spring pressed plunger mounted on said carriage and disposed normal to its path of movement, a micrometer microscope mounted on said carriage normal to its path of movement and to that of the plunger, a transparent scale disposed below said microscope and parallel to the path of movement of the carriage, means for shifting said scale longitudinally of its length, an angularly disposed mirror on said carriage disposed below said scale and aligned with said microscope, and means for directing light on said mirror.

HENRY Q. MUNN.